Patented July 15, 1941

2,249,183

UNITED STATES PATENT OFFICE 2,249,183

PREPARATION OF MONOSUBSTITUTED UREAS

John Kenson Simons, Dormont, Pa., assignor to Plaskon Company, Inc., Toledo, Ohio, a corporation of Delaware No Drawing. Application June 21, 1938, Serial No. 214,955

3 Claims. (Cl. 260—553)

The invention relates to the preparation of monosubstituted ureas, particularly alkylol ureas.

Monosubstituted ureas are useful in resin chemistry. It has been found that the most effective plasticizers for formaldehyde-urea molding compositions are compounds, such as monosubstituted ureas, that are structurally similar to urea.

Monosubstituted ureas having an aromatic group in the molecule do not make good plasticizers because of their high melting points.

Heretofore alkylol ureas have only been prepared by the following methods:

(1) Reaction of ammonia with the alkyl isocyanate (RNCO).
(2) Reaction of carbamyl chloride (ClCONH$_2$) with the amine.
(3) Reaction of inorganic cyanate with the amine salt.
(4) Reaction of nitro-urea (NO$_2$NHCONH$_2$) with the amine.

None of the above methods is suitable for large-scale production.

The principal object of the invention is the preparation of alkylol ureas by methods suitable for large-scale production. More specific objects and advantages are apparent from the description, which merely discloses and illustrates the invention and is not intended to impose limitations upon the claims.

Aliphatic amines, such as butyl amine, have been reacted with urea, but the only product isolated has been a symmetrically disubstituted urea, such as dibutyl urea. A symmetrically disubstituted urea does not act as a plasticizer for formaldehyde-urea products. It does not have an NH$_2$ group connected to a CO group, as in a monosubstituted urea.

The present invention is based upon the discovery that mono-amino alkanols, such as ethanol amine (NH$_2$CH$_2$CH$_2$OH)), and isopropanol amine (NH$_2$CH$_2$CH(OH)CH$_3$), react with urea to form monosubstituted ureas. The reaction is preferably carried out by heating urea in an aqueous solution with the amine and allowing the evolved ammonia to escape.

*Example*

Ethanol amine (152 parts), urea (150 parts), and water (65 parts) are refluxed until loss of ammonia ceases (about 3 hours). Decolorizing carbon is then added to the hot solution, and it is filtered and boiled until all the water has been lost. After the resultant viscous liquid has been chilled sufficiently to initiate crystallization, the liquid is diluted with about one-half its volume of absolute ethanol. Then the mixture is kept at 10° C. or less until crystallization has been completed, and a product (beta-hydroxyethyl urea) is obtained by recrystallization from absolute ethanol that is perfectly colorless and melts at 90-92° C. The use of water cuts down the formation of impurities by side reactions. Beta-hydroxypropyl urea may be prepared by the reaction in aqueous solution of isopropanol amine and urea, in a similar way.

The embodiments of the invention that have been disclosed may be modified to meet various requirements.

Having described my invention, I claim:

1. A method of preparing a hydroxyalkyl urea that comprises heating urea in an aqueous solution with a lower mono-amino alkanol until ammonia is formed said heating being insufficient to decompose the monosubstituted urea.

2. A method of preparing beta-hydroxyethyl urea that comprises heating urea in an aqueous solution with ethanol amine until ammonia is formed, said heating being insufficient to decompose the monosubstituted urea.

3. A method of preparing beta-hydroxpropyl urea that comprises heating urea in an aqueous solution with isopropanol amine until ammonia is formed, said heating being insufficient to decompose the monosubstituted urea.

JOHN KENSON SIMONS.